March 28, 1939. T. FLINT 2,151,693
CONVEYER BUNCHING DEVICE
Filed June 24, 1937 2 Sheets-Sheet 2
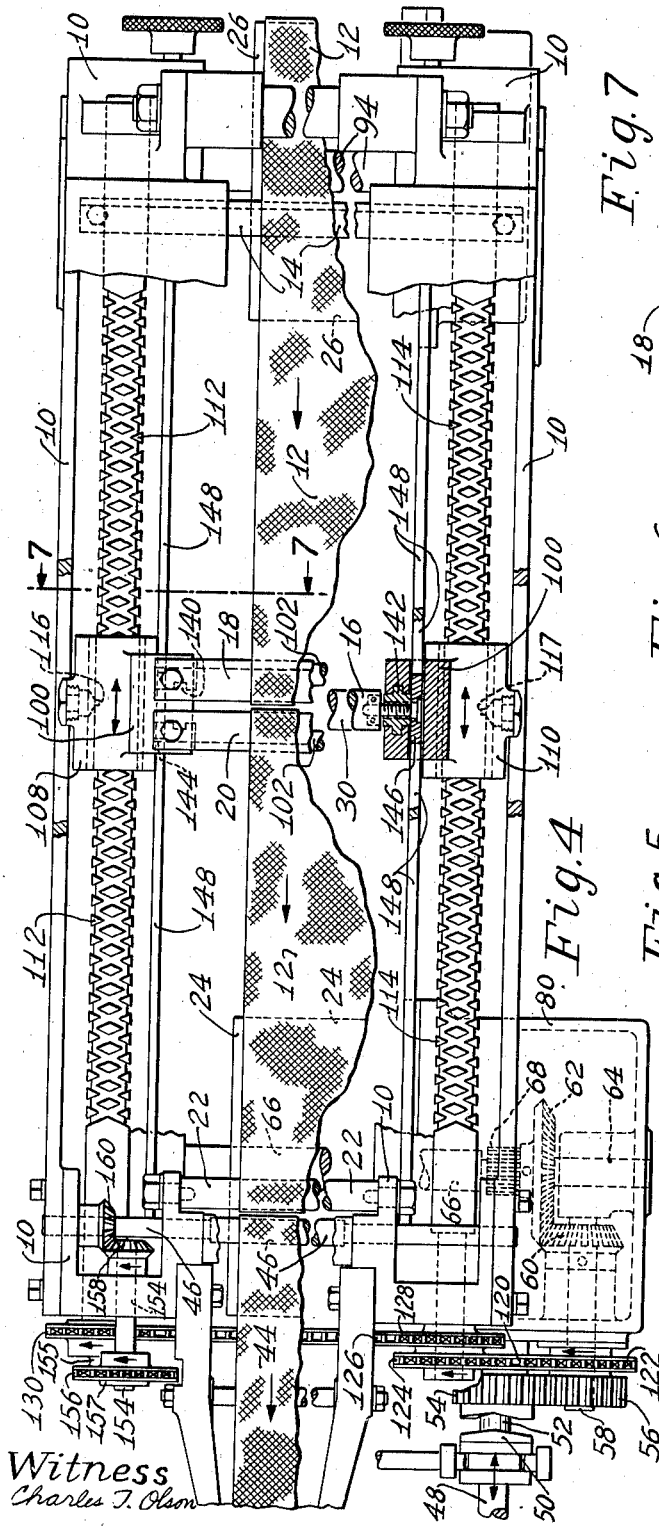
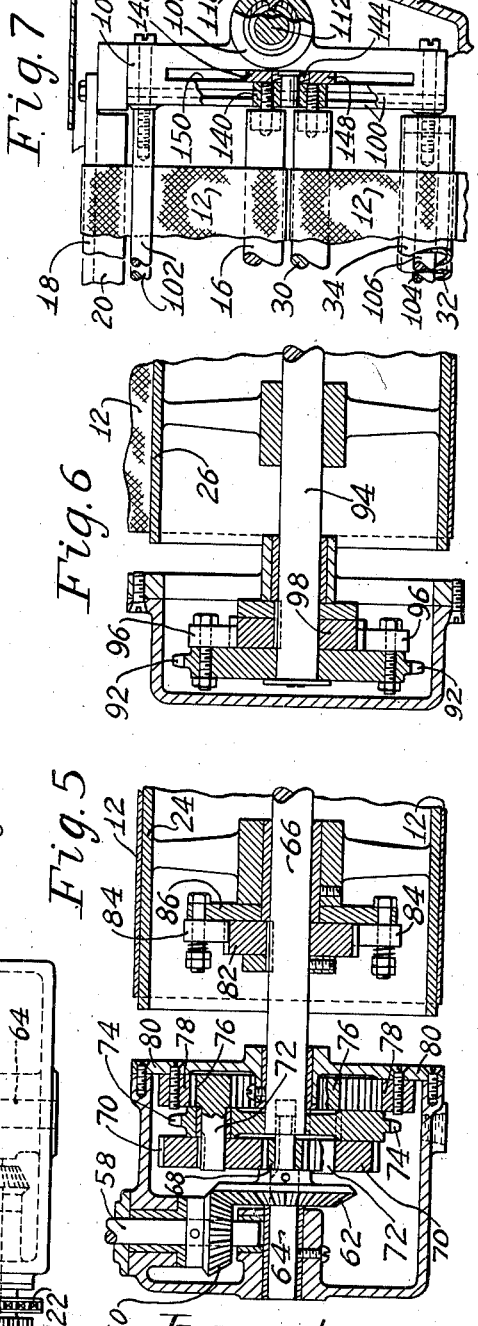
Inventor
Thomas Flint Patented Mar. 28, 1939

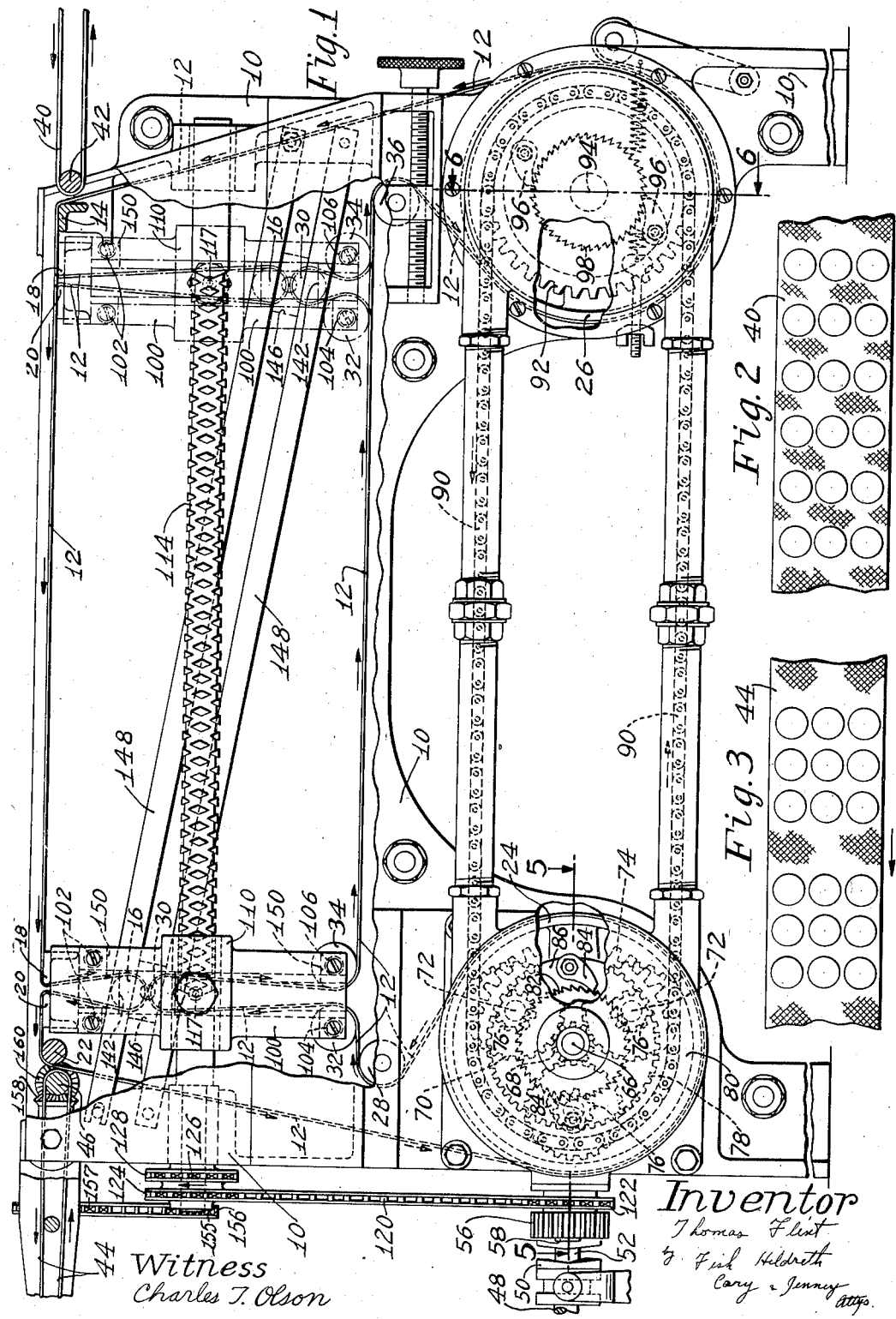

2,151,693

UNITED STATES PATENT OFFICE 2,151,693

CONVEYER BUNCHING DEVICE

Thomas Flint, Concord, Mass., assignor to J. W. Greer Company, Inc., a corporation of Massachusetts Application June 24, 1937, Serial No. 150,143

17 Claims. (Cl. 198—34)

The present invention relates to improvements in conveyer bunching devices, and more particularly to a bunching device well adapted for use in the manufacture of confections which are delivered to or placed upon a conveyer at spaced intervals to vary the spacing of the confections in accordance with a predetermined pattern into groups or squads separated by gaps for delivery into pans or similar containers.

It is a principal object of the invention to provide a novel and improved bunching device of this general description which will operate efficiently and without disarrangement of or injury to the confections to produce the desired bunching effect.

It is more specifically an object of the invention to provide a conveyer bunching device in which the bunching effect is produced by relative movement of cooperating conveyer surfaces constructed and arranged to vary the spacing of the confections with a minimum variation in the rate of movement of the conveyer surfaces and the confections supported thereon, and in which transfer gaps are employed between adjacent conveyer sections which may be and preferably are on the same level for the most efficient handling of the confections.

With these and other objects in view, as may hereinafter appear, a principal feature of the invention consists in the provision in a conveyer bunching device, of two complementary moving conveyer sections separated by a transfer gap in combination with means for varying inversely the relative lengths of the complementary conveyer sections to increase the length of first one and then the other conveyer section at a substantially uniform rate, and variable speed driving means for the two sections operable to drive each section at one rate while it is being increased in length and at a faster rate while it is being reduced in length, said rates being adjusted with relation to the rate of variation in length to prevent confections from crossing the transfer gap during the movement of the gap in the direction of feed, whereby a space is opened up between the confections grouped on opposite sides of said gap.

In a conveyer bunching device having the general organization above set forth, it will readily be seen that only a very slight differential in the driving rates of the complementary conveyer surfaces is necessary to provide a relatively large gap or spacing between adjacent squads, since this spreading movement is allowed to continue during the entire time in which the transfer gap moves in the direction of feed. This mode of operation of applicant's bunching device, in which changes in the grouping or spacing of confections conveyed thereon is very gradually secured during the reciprocating movement of the transfer gap, has the effect of minimizing and for all practical purposes eliminating differences in spacing of the bunched articles, which might result, for example, from the reversal in the direction of movement of the transfer gap at either end of its travel.

Another feature of the invention consists more specifically in the provision of a single, endless conveyer belt passing over relatively fixed receiving and discharge stations, and having interposed between said stations a compensating take-up reciprocable in the line of conveyer feed and arranged during the advancing movement thereof to give up slack on the feeding side of the belt and to take in slack on the return side of the belt, and conversely during its retracting stroke to take in slack from the upper side of the belt and give up slack on the lower side of the belt, together with variable speed driving means for driving the portions of the belt on each side of the take-up at speeds which are determined in accordance with the rate of travel of the compensating take-up.

The several features of the invention consist also in the devices, combination and arrangement of parts hereinafter described and claimed which, together with the advantages to be obtained thereby will be readily understood by one skilled in the art from the following description taken in connection with the accompanying drawings, in which Fig. 1 is a view in side elevation of applicant's conveyer bunching device, portions of the frame having been broken away to show underlying parts; Figs. 2 and 3 are somewhat diagrammatic showings of sections of loading and unloading conveyers associated with the bunching device illustrating the relative positions of the confections thereon before and after the bunching operation has taken place; Fig. 4 is a plan view of the bunching conveyer device illustrated in Fig. 1, with portions broken away to illustrate more clearly underlying parts; Fig. 5 is a detail sectional plan view taken on the line 5—5 of Fig. 1, showing a portion of the driving connections for the bunching conveyer device, and more particularly for the leading conveyer driving drum; Fig. 6 is a detail sectional view taken on the line 6—6 of Fig. 1, looking from the rear, and illustrating particularly the driving connections for the rear conveyer driving drum; Fig. 7 is a detail sectional view taken on the line 7—7 of Fig. 4, looking from the rear, illustrating more particularly features of the construction of the compensating take-up and the means for driving the same.

The conveyer bunching device herein disclosed as embodying in a preferred form the several features of the present invention, is constructed and arranged to be installed as a separate unit in a conveyer system, and to operate without disturbing the feeding rates of the adjacent conveyers or feed units to transform the uniform flow of confections into a series of separated squads or bunches for delivery into pans or similar containers.

Applicant's device comprises essentially two complementary conveyer sections separated by a transfer gap and arranged to transfer confections between two relatively stationary receiving and discharge stations. In order to secure the desired bunching effect, means are provided for varying inversely the length of the two conveyer sections, so that the transfer gap reciprocates first in the same direction and then in the opposite direction to that of feed. The conveyer section which is being lengthened is always driven at the same speed with which it is being lengthened, the other conveyer section being driven at a slightly faster rate.

In the illustrated form of the invention, the complementary conveyer sections are formed from a single endless conveyer belt which passes around two relatively fixed points comprising the receiving and discharge stations, and around the rollers of a compensating take-up which is arranged to take up slack both in the feeding and return sides of the belt, and provides a transfer gap between the two conveyer sections. Two driving drums are provided, one being located adjacent each of the receiving and discharge stations. The drums are arranged to be driven at the same peripheral speed through mechanism having provision to permit the overrunning of each drum with relation to its drive. As hereinafter more fully set forth, the compensating take-up is arranged during the movement thereof in the direction of feed, to give up slack to the upper or feeding side of the conveyer, and to take it in from the bottom side, and on the reverse or return stroke of the compensating take-up, to give out slack to the under side of the belt, and to take it in from the top side.

Referring more specifically to the drawings, the bunching conveyer unit comprises a frame 10 on which are supported the several supporting and driving connections for an endless conveyer belt 12. As best shown in Figs. 1 and 4 of the drawings, the belt 12 passes upwardly over a loading or receiving knife edge 14, around a knife edge 18, take-up roller 16, and knife edge 20 forming a part of the compensating take-up more fully hereinafter to be described, thence over an idler roll 22 which provides an unloading or discharge station for the bunching conveyer unit. For driving the belt 12, two drums 24 and 26 are provided, around which the belt 12 passes, being guided from the drum 24 around a stationary idler roller 28, and thence around roller 32, take-up roll 30 and roller 34 forming part of the compensating take-up, then passing around a stationary idler roller 36 to the drum 26, whence the belt again passes to the receiving knife edge 14. For clarity of illustration, one end of a conveyer 40 which may be designated as a loading conveyer, is illustrated in Fig. 1 passing around a roller 42 to transfer confections to the travelling bunching conveyer belt 12. There is also illustrated in connection with applicant's conveyer bunching device, an unloading conveyer 44 passing around a roller 46, and arranged in close proximity to the unloading end of the bunching device to receive the bunched confections as they are discharged over the roller 22.

With the construction illustrated, the drums 24 and 26 are continuously driven at the same peripheral speed through mechanism having provision for over-drive of the belt with relation to the driving connections. The machine drive is taken from a main drive shaft 48 which is arranged to be connected through a clutch member 50 with an axially aligned driven shaft 52. A gear 54 on shaft 52 meshes with a gear 56 supported on a short drive shaft 58. The shaft 58 is connected through bevel gears 60 and 62 to a stub shaft 64 supported in axial alignment with the pivot shaft 66 for the drum 24. The shaft 64 is connected to drive the shaft 66 through a reduction gear mechanism which comprises a spur gear 68 which is engaged by three planet gears 70 secured to pivot shafts 72 on a sprocket 74 keyed to turn with the shaft 66. There is also secured to each of the pivot shafts 72, a small gear 76 which engages with a stationary internal ring gear 78 secured to a face of the reduction gear housing 80. The rotation of the sprocket 74 and hub shaft 66 through the reduction gear connections above described, is rendered operative to drive the drum 24 through a pawl and ratchet connection including a ratchet 82 keyed to the shaft 66 and pawls 84 supported on a flange portion 86 of a sleeved hub of the driving drum 24. The rear drum 26 of the machine is driven in synchronism with the drum 24 through connections which include a sprocket chain 90 which passes respectively around the sprocket 74 and around a sprocket 92 loosely mounted to turn on the pivot shaft 94 for the drum 26. Pawls 96 secured at spaced intervals around the periphery of the sprocket 92, engage with a ratchet 98 which is permanently fixed to turn with the shaft 94 and drum 26. With the construction and arrangement of the ratchet and pawl driving connections for the drums 24 and 26 above described, it will readily be seen that these drums are positively driven at a definite minimum speed, but that either drum may be permitted to overrun its driving mechanism when pulled along at a faster rate by the operation of the compensating take-up, as hereinafter more fully set forth.

The compensating take-up which is provided in accordance with the present invention, takes the form of a frame having two uprights 100 which are rigidly tied together at their upper ends by means of the knife edges 18 and 20 and tie rods 102, and at their lower ends by means of tie rods 104 and 106 on which are mounted respectively the take-up rolls 32 and 34. The compensating take-up is supported by means of sleeve bearings 108 and 110 formed respectively in the uprights 100 for engagement upon two horizontally parallel spiral cam shafts 112 and 114 located one at each side of the machine. The compensating take-up 100 is connected to be driven from the spiral cams 112 and 114 by means of followers 116 and 117 (see Figs. 4 and 7) supported respectively within the sleeve bearings 108 and 110 for engagement with the cam grooves.

The cam shafts 112 and 114 are driven in unison from the drive shaft 58 through connections which include a chain 120 passing over sprockets 122 and 124 mounted respectively on the shaft 58 and on the cam shaft 114. The cam shaft 112 is connected to turn with the shaft 114 by means of a chain 126 which rides on sprockets 128 and 130 carried respectively on the cam shafts 112 and 114. The driving ratios for the cam shafts 112 and 114 and conveyer drums 24 and 26 are so adjusted that the compensating take-up 100 will be reciprocated in the line of feed at substantially the same rate with which the conveyer belt 12 is driven by the drums 24 and 26.

Another feature of applicant's invention consists in the provision of compensating take-up means including more specifically the take-up rollers 16 and 30 which are rendered operative during the travel of the compensating take-up forward and back in the direction of feed, to give up or take in slack from the feed side of the endless conveyer belt 12, and at the same time to give out or take in slack from the return side of the belt. To this end the take-up rollers 16 and 30 are supported in spaced relation on vertically movable slide members 140 and 142 carried in vertical guideways formed in the upright members 100. The vertical positions of the slides 140 and 142 and take-up rollers 16, 30, are determined during the lengthwise travel of the compensating take-up by the engagement of blocks 144 and 146 respectively with sloping guide rails 148 rigidly secured to the machine and extending along opposite sides of the path of travel of the compensating take-up. The rails 148 are arranged to pass through vertical slots 150 formed respectively in the uprights 100 in order to insure an accurate guiding relation between the rails 148 and the guide blocks 144 and 146 during the lengthwise traverse of the compensating take-up.

The unloading conveyer 44 is in the present instance, driven from the main drive shaft 52 at exactly the same peripheral rate as the driving drums 24 and 26 through connections which include a shaft 154 driven from the cam shaft 112 by means of sprockets 155 and 157 and chain 156. The shaft 154 is connected through the intermeshing bevel gears 158, 160 to the drive roller 46 over which the unloading conveyer 44 passes.

The operation of the bunching conveyer above set forth, may be briefly described as follows: Assuming that the auxiliary take-up is at the forward end of its stroke in the position shown in full lines in Fig. 1, the continued rotation of the spiral cam shafts 112 and 114 will cause the auxiliary take-up to start on its return movement to the right at a linear rate of speed equal to that positively imparted to the conveyer belt 12 by the driving drum 24. With the illustrated form of applicant's device, it may also be assumed that the loading conveyer 40 and the unloading conveyer 44 are driven at the same linear speed with which the peripheral portions of the bunching conveyer drums 24 and 26 are positively driven. During the movement of the compensating take-up to the right, the take-up rollers 16 and 30 controlled by the engagement of the slide blocks 146 with the guides 148, will be moved gradually down, causing slack to be taken in on the upper or feeding side of the belt 12, and an equivalent amount of slack to be given up to the under side of the belt. Inasmuch as the driving roll 24 is positively drawing the belt from the discharge roll 22 at a predetermined rate, the effect of taking up slack on the feed side of the belt will be to increase the rate of travel of the right hand section of the belt 12 approaching the compensating take-up knife edge 18, the drum 26 as above pointed out, being permitted to overrun its driving mechanism. The left hand section of the bunching conveyer belt 12 between the unloading station 22 and the knife edge 20 which is being lengthened, is therefore, driven at the slower or normal rate, while the right hand section comprised between the knife edge 18 and loading station 14 which is being shortened, is driven at the faster rate. The compensating take-up having reached the dotted line position to the right, shown in Fig. 1, immediately starts its return movement to the left. The take-up rolls 16 and 30 are now moved gradually upward, causing slack to be given up to the upper or feed side of the bunching conveyer, and to be taken in from the lower or return side of the conveyer 12. Inasmuch as the drum 26 operates to positively draw the belt from the return side of the conveyer at the predetermined normal rate, the slack is taken in on the return side of the conveyer by drawing the belt more rapidly from the drum 24 which is thus turned ahead of its driving mechanism, causing the left hand section of the conveyer 12 between the knife edge 20 and unloading station 22 which is now being shortened, to be driven at the faster rate, while the right hand section of the conveyer belt comprised between the knife edge 18 and the loading station 14 is driven at the slower normal rate.

The bunching conveyer device operates during the rearward and forward movements of the compensating take-up above described, to produce a bunching action on the confections delivered thereto from the loading conveyer 40 as follows:

With the bunching take-up in its extreme position to the left as shown in full lines in Fig. 1, the right hand section of the belt 12 between the knife edge 18 and loading station 14, is fully loaded with confections having the spacing thereof unchanged. As the compensating take-up is now moved to the right, the rate of movement of the right hand section of the conveyer belt which is being shortened, is speeded up, and the left hand section of the belt which is being lengthened is driven at the slow rate, so that the confections which are now transferred across the gap 18, 20 are relatively bunched. By the time the compensating take-up has reached the extreme limit of its movement to the right, as shown in the dotted line position in Fig. 1, all of the confections originally supported on the right hand conveyer section 12 will have been transferred across the gap 18, 20 onto the left hand conveyer section in a relatively bunched relation, and will have passed across the unloading station 22 onto the unloading conveyer belt 44. Inasmuch as the left hand conveyer section 12 is moving at the slower or normal rate, these confections are maintained in the same bunched relation when transferred onto the belt 44. During this movement of the auxiliary take-up to the right, the confections which are being continuously delivered to the loading station 14 from the conveyer belt 40, are relatively spread as they are transferred onto the more rapidly moving right hand section of the conveyer belt 12. These confections are again bunched as they are transferred across the gap 18, 20 onto the slower moving left hand belt section between the knife edge 20 and unloading station 22. With the compensating take-up in its extreme dotted line position to the right, the fully elongated left hand section of the belt 12 will, therefore, have been fully loaded with confections which have been spread and again bunched, so that they are maintained in substantially their initial spaced relation.

As the compensating take-up is again moved to the left, the left hand section of the conveyer belt is again speeded up, so that the confections loaded thereon are discharged across the unloading gap 22 at a faster rate, causing these confections again to be relatively bunched as they are delivered onto the unloading conveyer 44. During this movement of the compensating take-up to the left, the portion of the belt passing over the knife edge 18, remains relatively stationary thereto, due to the fact that the compensating take-up is travelling at the same rate of speed as the right hand section of the belt 12 which is being elongated, so that no confections are delivered across the transfer gap 18, 20. At the same time, all of the confections on the left hand section of the conveyer belt 12 which is now travelling at the faster rate, will have been delivered onto the unloading conveyer 44, thus establishing a gap or space between the group of confections being unloaded ahead of the compensating take-up, and those being loaded without change in spacing onto the right hand section of the belt to the rear of the compensating take-up. This gap exactly equals the amount of belt given up by the compensating take-up during its forward travel in the direction of feed.

It will be readily understood from the above description, that the amount of the bunching action produced by the bunching conveyer and the width of the gap introduced between the successive bunches, may be adjusted by varying the angle at which the guideways 148 are mounted in the machine, which in turn determines the amount of slack which is taken in and given up from the feed side of the bunching conveyer belt 12. It will be appreciated also that only a slight variation in the rates of travel of the two sections of the conveyer belt 12 is produced by the movement of the take-up during its reciprocatory movement in the line of feed, which will have no tendency to disturb or in any way injure the confections during the bunching operation. Applicant's bunching device as above described, has the further advantage that the bunching action is produced entirely by means of moving conveyer belts which are constructed and arranged to cause the confections to be transferred from one belt to another in a most efficient manner always at the same level. The variations in the relative rate of travel of the feeding belt sections at each transfer gap including that across the knife edges 18, 20, and those located at the loading station 14 and unloading station 22, which result from the operation of applicant's device are so small as not in any way to disturb the confections during transfer from one belt to another. Applicant's device is of particular advantage when employed with a conveyer system in which the units of the system are continuously driven to enable the bunching action to be produced with only the slightest change in the actual rate of travel of the confections, thus avoiding the shocks and possible disarrangement or injury to the confections themselves which might otherwise result from starting and stopping the belts, and permitting the whole conveyer system to be operated most efficiently at a high rate of speed.

It will be understood that the invention is not limited to the specific embodiment shown, and that various deviations may be made therefrom without departing from the spirit and scope of the appended claims.

What is claimed is:

1. A conveyer bunching device having two complementary moving conveyer sections separated by a transfer gap, means for varying inversely the relative length of said complementary conveyer sections to increase the length of first one and then the other conveyer section at a substantially uniform rate, and variable speed driving means for the two conveyer sections operable to drive each of said conveyer sections at the same rate with which they are increased in length, and at a faster rate than that with which they are reduced in length.

2. A conveyer bunching device having two complementary moving conveyer sections separated by a transfer gap and cooperating to transfer material between fixed loading and unloading stations, means for varying inversely the length of said complementary conveyer sections to increase the length of first one and then the other conveyer section at a substantially uniform rate, and variable speed driving means for the two conveyer sections operable to drive each of said conveyer section at one rate while it is being increased in length, and at a faster rate while it is being reduced in length, said rates being adjusted with relation to the rate of increase in length to prevent material from crossing the transfer gap during movement of the gap in the direction of feed, whereby a space is opened up between materials grouped on opposite sides of said gap.

3. A conveyer bunching device having, in combination with loading and unloading conveyers, two complementary moving conveyer sections interposed therebetween having a fixed combined length and separated by a transfer gap, means for varying inversely the lengths of said complementary conveyer sections to increase the length of first one and then the other conveyer section at a substantially uniform rate, and variable speed driving means for the two conveyer sections operable to drive each of said conveyer sections at one rate while it is being increased in length, and at a faster rate while it is being reduced in length, said rates being adjusted with relation to the rate of increase in length to prevent material from crossing the transfer gap during movement of the gap in the direction of feed, whereby a space is opened up between materials grouped on opposite sides of said gap.

4. A conveyer bunching device having two complementary conveyer sections separated by a transfer gap and cooperating to transfer materials between loading and unloading stations, means for varying the position of the transfer gap to vary inversely the relative length of said complementary conveyer sections and thereby to increase the length of first one and then the other conveyer section at a substantially uniform rate, and variable speed driving means for the two conveyer sections operable to drive each of said conveyer sections at the same rate with which they are increased in length, and at a faster rate than that with which they are reduced in length, whereby the bunching conveyer device is loaded during the movement of the transfer gap in the direction of feed with normally spaced materials which during the return movement of the transfer gap are then bunched across the transfer gap and discharged in said bunched relation, and whereby the bunching conveyer is loaded during the movement of the transfer gap in a direction reverse to that of feed with materials relatively spread at the loading station, and then bunched to normal position across the transfer gap, which materials during the return movement of the transfer gap are again bunched and discharged at the unloading station.

5. A conveyer bunching device having in combination, an endless conveyer, relatively stationary guide elements over which the conveyer passes, a compensating take-up comprising take-up members engaging the feeding and return portions of said conveyer between said guide elements, and guide members disposed to provide a transfer gap in the feeding portion of the conveyer, means for reciprocating the compensating take-up in the line of feed, and means operable during the advancing movement of the compensating take-up to move said take-up members to take up slack from the return portion of the conveyer and to let out slack to the feed portion thereof, and operable during the retracting movement of the compensating take-up to take up slack from the feed portion thereof and to let out slack to the return portion of the conveyer, and driving devices engaging portions of the conveyer on opposite sides of said compensating take-up to drive the conveyer at a uniform minimum rate, each of said devices having provision to permit the overrunning of the conveyer.

6. A conveyer bunching device having, in combination, an endless conveyer, relatively stationary guide elements over which the conveyer passes, a compensating take-up comprising take-up members engaging the feeding and return portions of said conveyer between said guide elements, and guide members disposed to provide a transfer gap in the feeding portion of the conveyer, means for reciprocating the compensating take-up in the line of feed, means operable during movement of the compensating take-up in one direction to move said take-up members to take up slack from one side of the conveyer and to let out slack from the other side thereof, and operable during the return movement of the compensating take-up to let out slack from the first-mentioned side of the conveyer and to take in slack from the last-mentioned side thereof, and driving devices engaging portions of the conveyer on opposite sides of the compensating take-up to drive the conveyer at a uniform minimum rate, each of said devices having provision to permit the overrunning of the conveyer.

7. A conveyer bunching device having, in combination, an endless conveyer, relatively stationary guide elements over which the conveyer passes to provide receiving and discharge stations therefor, a compensating take-up comprising a carriage movable in the line of feed, take-up members on the carriage engaging the feeding and return portions of the conveyer between said receiving and discharge stations, and guide members on the carriage arranged to provide a transfer gap in the feeding portion of the conveyer, means for moving the take-up members on the carriage toward and away from the gap, means for reciprocating the carriage in the line of feed, means operable during the advancing movement of the carriage to move said support and take-up members toward the gap, and operable during the retracting movement of the carriage to move the support and guide members away from the gap, conveyer driving elements acting on portions of the conveyer on opposite sides of the compensating take-up, and driving connections therefor for positively driving the conveyer at a predetermined minimum rate, said driving connections having provision to permit the overrunning of each of said driving elements.

8. A conveyer bunching device having, in combination, an endless conveyer, relatively stationary guide supports between which the feeding portions of the conveyer are supported, a compensating take-up reciprocable between said supports in the line of conveyer feed and arranged during movement in the direction of feed to give up slack to the feeding side of the conveyer and to take in slack from the return side of the conveyer, and conversely during movement opposite to that of feed to take in slack from the upper side of the conveyer and to give up slack to the return side of the conveyer, and means acting on portions of the conveyer on opposite sides of the compensating take-up to drive said portions of the conveyer at a predetermined minimum rate.

9. A bunching conveyer device having in combination, an endless conveyer, relatively stationary guide supports between which the feeding portions of the conveyer are supported, a compensating take-up comprising a carriage, a pair of spiral cam shafts for supporting and reciprocating the carriage in the line of feed, conveyer guides on the carriage arranged to provide a transfer gap in the feeding surface of the conveyer, a take-up support vertically movable on the carriage and take-up members thereon to take up slack from both the feeding and return portions of the conveyer, cam followers on the take-up support and stationary cams cooperating therewith inclined upwardly in the direction of feed for controlling the vertical movements of the support, driving rollers for the conveyer located on opposite sides of the compensating take-up, means for driving the spiral cam shafts to reciprocate the carriage at a predetermined rate, and means for positively driving each of said rollers at the same peripheral rate with which the carriage is traversed, said means having provision to permit overrunning of either of said rollers and the portion of the conveyer supported thereon.

10. A conveyer bunching device having, in combination with loading and unloading conveyers, two complementary moving conveyer sections interposed therebetween having a fixed combined length and separated by a transfer gap, relatively stationary guide elements over which the conveyer passes to provide loading and unloading stations for said bunching conveyer sections at substantially the same level with the loading and unloading conveyers cooperating therewith, means for varying the position of the transfer gap to vary inversely the relative length of said complementary conveyer sections and thereby to increase the length of first one and then the other conveyer section at substantially a uniform rate, and variable speed driving means for the two conveyer sections arranged to drive each of said conveyer sections at the same rate with which they are increased in length, and at a faster rate than that with which they are reduced in length.

11. A conveyer bunching device having, in combination with loading and unloading conveyers of an endless bunching conveyer, relatively stationary guide elements over which the bunching conveyer passes to provide receiving and discharge stations therefor substantially on a level with the loading and unloading conveyers, a compensating take-up comprising a carriage movable in the line of feed, guide members on the carriage arranged to provide a transfer gap in the feeding portion of the bunching conveyer, take-up members engaging the feeding and return portions of the bunching conveyer, a take-up support for said members movable on the carriage to take in and give up slack simultaneously to the feeding and return portions of the bunching conveyer, means for reciprocating the carriage at a predetermined uniform rate in the line of feed between said loading and unloading stations, means controlled by the movement of the carriage for moving the take-up support during movement of the carriage in the direction of feed to give up slack to the feeding side of the conveyer and to take in slack from the return side of the conveyer, and conversely during movement of the carriage opposite to that of feed to take in slack from the feeding side of the conveyer and to give up slack to the return side of the conveyer, and driving means acting on portions of the conveyer on opposite sides of the carriage to drive said portions of the conveyer at the same rate with which the carriage is driven, said means having provision to permit overrunning of the portions of the conveyer driven thereby.

12. A conveyer bunching device for materials conveyed thereon having two complementary moving conveyer sections mutually abutting to form a transfer gap, means for varying inversely the relative length of said complementary conveyer sections to increase the length of first one and then the other conveyer section, and driving means for the two conveyer sections including means operable during the movement of the gap in the direction of feed to drive the conveyer section which is being increased in length at the slower of two selected rates, and the complementary conveyer section which is being reduced in length at the faster of said selected rates, said rates being adjusted with relation to the rate of variation in length to prevent material from crossing the transfer gap during movement of the gap in the direction of feed, whereby a space is opened up between the materials grouped on opposite sides of said gap.

13. A conveyer bunching device for materials conveyed thereon having two complementary moving conveyer sections, guiding elements having a spaced relationship to support adjoining portions of said conveyer sections in mutually abutting relationship to form a transfer gap, means for moving said spaced elements in a reciprocatory path to increase the length of the one and to reduce the length of the other conveyer section, and then to increase the length of the latter and to reduce the length of the former conveyer section, and driving means for the two conveyer sections including means operable during the movement of the gap in the direction of feed to drive the conveyer section which is being increased in length at the slower of two selected rates, and the complementary conveyer section which is being reduced in length at the faster of said selected rates, said rates being adjusted with relation to the rate of variation in length to prevent material from crossing the transfer gap during movement of the gap in the direction of feed, whereby a space is opened up between the materials grouped on opposite sides of said gap.

14. A conveyer bunching device for materials conveyed thereon having two complementary moving conveyer sections separated by a transfer gap, means for varying inversely the relative length of said complementary conveyer sections to increase the length of first one and then the other conveyer section at a substantially uniform rate, and variable speed driving means for the two conveyer sections operable to drive each of said conveyer sections at the slower of two selective rates while it is being increased in length, and at the faster of said two selective rates while it is being reduced in length, said rates being adjusted with relation to the rate of variation in length, to prevent material from crossing the transfer gap during movement of the gap in the direction of feed, whereby a space is opened up between the materials grouped on opposite sides of said gap.

15. A conveyer bunching device for materials conveyed thereon having two complementary moving conveyer sections mutually abutting to form a transfer gap, means for varying inversely the relative length of said complementary conveyer sections to increase the length of first one and then the other conveyer section at a substantially uniform rate, variable speed driving means for the two conveyer sections operable to drive each of said conveyer sections at one rate while it is being increased in length, and at a faster rate while it is being reduced in length, said rates being adjusted with relation to the rate of variation in length to prevent material from crossing the transfer gap during the movement of the gap in the direction of feed, whereby a space is opened up between the materials grouped on opposite sides of said gap.

16. A conveyer bunching device for materials conveyed thereon having two complementary moving conveyer sections, guiding elements having a spaced relationship to support adjoining portions of said conveyer sections in mutually abutting relationship to form a transfer gap, means for moving said spaced elements in a reciprocatory path to increase the length of the one and to reduce the length of the other conveyer section, and then to increase the length of the latter and to reduce the length of the former conveyer section, variable speed driving means for the two conveyer sections operable to drive each of said conveyer sections at one rate while it is being increased in length, and at a faster rate while it is being reduced in length, said rates being adjusted with relation to the rate of movement of said spaced elements to prevent material from crossing the transfer gap during movement of the gap in the direction of feed, whereby a space is opened up between the materials grouped on opposite sides of said gap.

17. A conveyer bunching device having, in combination, an endless conveyer, relatively stationary guide elements over which the conveyer passes, a compensating take-up comprising take-up members engaging the feeding and return portions of said conveyer between said guide elements, and guide elements disposed to provide a transfer gap in the feeding portion of the conveyer, means for reciprocating the compensating take-up in the line of feed comprising a continuously rotating spiral cam, means operable during movement of the compensating take-up in one direction to move said take-up members to take up slack from one side of the conveyer and to let out slack from the other side thereof, and operable during the return movement of the compensating take-up to let out slack from the first-mentioned side of the conveyer and to take in slack from the last-mentioned side thereof, and driving devices engaging portions of the conveyer on opposite sides of the compensating take-up to drive the conveyer at a uniform minimum rate, each of said devices having provision to permit the overrunning of the conveyer.

THOMAS FLINT.